United States Patent
Oh et al.

(10) Patent No.: US 11,831,750 B2
(45) Date of Patent: *Nov. 28, 2023

(54) METHOD FOR SELECTING CONSENSUS NODE USING NONCE AND METHOD AND APPARATUS FOR GENERATING BLOCKCHAIN USING THE SAME

(71) Applicant: ELECTRONICS AND TELECOMMUNICATIONS RESEARCH INSTITUTE, Daejeon (KR)

(72) Inventors: Jin-Tae Oh, Daejeon (KR); Ki-Young Kim, Daejeon (KR); Joon-Young Park, Hanam (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 238 days.

This patent is subject to a terminal disclaimer.

(21) Appl. No.: 17/343,556

(22) Filed: Jun. 9, 2021

(65) Prior Publication Data
US 2021/0297239 A1    Sep. 23, 2021

Related U.S. Application Data

(63) Continuation of application No. 16/389,620, filed on Apr. 19, 2019, now Pat. No. 11,063,746.

(30) Foreign Application Priority Data

Apr. 19, 2018   (KR) .................. 10-2018-0045705
Apr. 1, 2019    (KR) .................. 10-2019-0037604

(51) Int. Cl.
*H04L 9/06* (2006.01)
*H04L 9/08* (2006.01)

(52) U.S. Cl.
CPC .......... *H04L 9/0637* (2013.01); *H04L 9/0643* (2013.01); *H04L 9/0825* (2013.01); *H04L 9/0861* (2013.01)

(58) Field of Classification Search
CPC ... H04L 9/0637; H04L 9/0643; H04L 9/0825; H04L 9/0861
(Continued)

(56) References Cited

U.S. PATENT DOCUMENTS

| | | | | |
|---|---|---|---|---|
| 7,975,016 | B2 * | 7/2011 | Blanc ...................... | H04L 41/30 |
| | | | | 709/208 |
| 8,762,729 | B2 * | 6/2014 | Hwang ................. | H04L 9/3255 |
| | | | | 713/176 |

(Continued)

FOREIGN PATENT DOCUMENTS

| | | | | |
|---|---|---|---|---|
| CN | 107124403 A | * | 9/2017 | |
| EP | 3435273 A1 | * | 1/2019 | ........... H04L 9/0877 |

(Continued)

OTHER PUBLICATIONS

Satoshi Nakamoto, Bitcoin: A Peer-to-Peer Electronic Cash System, 2008, 9 Pages, www.bitcoin.org.

*Primary Examiner* — Badri Narayanan Champakesan

(57) ABSTRACT

Disclosed herein is a method for generating a blockchain, which includes selecting, by a first master node that generated a first block, second candidate nodes from a node pool according to a consensus node selection scheme using a nonce, and selecting, by the first master node, a second master node using the result of a vote taken by first candidate nodes. Here, among candidate blocks generated by the second candidate nodes, the candidate block generated by the second master node is locked as a second block.

5 Claims, 3 Drawing Sheets

(58) Field of Classification Search
USPC .......................................................... 713/157
See application file for complete search history.

(56) References Cited

U.S. PATENT DOCUMENTS

| | | | | |
|---|---|---|---|---|
| 8,966,273 | B2* | 2/2015 | Hwang | H04L 9/3255 |
| | | | | 713/176 |
| 9,813,243 | B1* | 11/2017 | Triandopoulos | H04L 63/061 |
| 10,204,341 | B2* | 2/2019 | Davis | G06Q 20/065 |
| 2005/0213751 | A1* | 9/2005 | Apostolopoulos | H04L 9/3242 |
| | | | | 380/28 |
| 2005/0268341 | A1* | 12/2005 | Ross | G06F 21/64 |
| | | | | 726/26 |
| 2010/0031025 | A1* | 2/2010 | Zhang | H04L 63/20 |
| | | | | 713/156 |
| 2011/0072206 | A1* | 3/2011 | Ross | G06F 16/173 |
| | | | | 711/108 |
| 2014/0019748 | A1* | 1/2014 | Jung | H04L 9/0861 |
| | | | | 713/150 |
| 2017/0075941 | A1* | 3/2017 | Finlow-Bates | H04L 9/3239 |
| 2017/0331896 | A1* | 11/2017 | Holloway | H04L 9/12 |
| 2017/0344987 | A1* | 11/2017 | Davis | H04L 9/30 |
| 2018/0121909 | A1* | 5/2018 | Christidis | H04L 9/3236 |
| 2018/0123882 | A1* | 5/2018 | Anderson | H04L 41/0813 |
| 2018/0181751 | A1* | 6/2018 | Jagadeesan | H04L 63/1441 |
| 2018/0212970 | A1* | 7/2018 | Chen | H04L 63/101 |
| 2018/0352033 | A1* | 12/2018 | Pacella | H04L 67/10 |
| 2019/0034465 | A1* | 1/2019 | Shimamura | H04L 9/3239 |
| 2019/0068380 | A1* | 2/2019 | Tang | H04L 9/3265 |
| 2019/0287199 | A1* | 9/2019 | Messerges | G06Q 50/265 |
| 2019/0287200 | A1* | 9/2019 | Schuler | G06Q 50/265 |
| 2020/0059369 | A1* | 2/2020 | Li | H04L 9/3297 |

FOREIGN PATENT DOCUMENTS

| | | |
|---|---|---|
| KR | 10-1727525 B1 | 4/2017 |
| KR | 1020170137388 A | 12/2017 |
| KR | 10-2018-0089670 A | 8/2018 |
| KR | 10-2018-0124545 A | 11/2018 |

* cited by examiner

METHOD FOR SELECTING CONSENSUS NODE USING NONCE AND METHOD AND APPARATUS FOR GENERATING BLOCKCHAIN USING THE SAME

CROSS REFERENCE TO RELATED APPLICATIONS

This application is a continuation of U.S. patent application Ser. No. 16/389,620, filed Apr. 19, 2019 and claims the benefit of Korean Patent Application No. 10-2018-0045705, filed Apr. 19, 2018, and No. 10-2019-0037604, filed Apr. 1, 2019, which are hereby incorporated by reference in their entirety into this application.

BACKGROUND OF THE INVENTION

1. Technical Field

The present invention relates to a method for selecting consensus nodes using a nonce and an apparatus and method for generating a blockchain using the same.

2. Description of the Related Art

Generally, a blockchain, which is a kind of distributed database, uses a Peer-to-Peer (P2P) network. Such a distributed database is technology that enables many users to share a large-scale database by physically distributing data. The blockchain constructs a P2P network between cryptocurrency users that are connected over the Internet. Here, cryptocurrency transaction records are stored in the computer of a user. Among the cryptocurrency transaction records, transaction records that match the data of the majority of the users are confirmed as legitimate ledger entries and collected and stored as a block. If an error, such as omission or the like, is found in the ledger of a certain user, the error is corrected by copying a normal ledger and replacing the ledger having the error with the copied ledger. A process is repeated in which, whenever a block containing a new transaction record is generated, the block is attached to the previous block. The name 'blockchain' comes from the transaction records (blocks), which are chained. When a transaction takes place, the details of the transaction owned by the respective users are compared. Accordingly, whether the transaction is authentic is checked, whereby data may be prevented from being forged. The larger the number of users that share data therebetween, the more secure the blockchain. A blockchain may be used in various online services, such as cloud-computing services and the like, as well as in bitcoin.

In the case of a private blockchain, blocks are maintained through distributed consensus between some authorized nodes. Through delegation of authority, a greater number of transactions may be processed compared to the case in which a public blockchain is used, but it is problematic in that the advantages of the public blockchain are lost. Accordingly, a new consensus algorithm applicable in common to a public blockchain and a private blockchain is required.

SUMMARY OF THE INVENTION

An object of the present invention is to provide a method and apparatus in which, among all nodes allowed to participate in distributed consensus, only some of them participate in consensus.

Another object of the present invention is to provide a method and apparatus for selecting subjects of distributed consensus, in which resource consumption is minimized by allowing only some nodes to participate in generating blocks, in which the nodes to obtain permissions to generate blocks are selected in an unpredictable manner while ensuring that more than a certain number of consensus nodes, which probabilistically represent all of the nodes, are selected, and in which a fork is prevented from being formed in a blockchain.

A further object of the present invention is to provide a method and apparatus for generating a blockchain, which prevents a ledger from being arbitrarily altered after a block is locked and which is applicable to both a public blockchain and a private blockchain.

A method for generating a blockchain according to an embodiment of the present invention may include selecting, by a first master node that generated a first block, second candidate nodes from a node pool according to a consensus node selection scheme using a nonce; generating, by each of the selected second candidate nodes, a second candidate block; and selecting, by the first master node, a second master node from among the second candidate nodes based on the result of a vote for the generated second candidate blocks, which is taken by first candidate nodes, wherein a candidate block generated by the second master node may be locked as a second block.

In an embodiment, the nonce may be generated using the head hash value of the block generated by the first master node and a unique value possessed by each node.

In an embodiment, the unique value may be a private key or a value acquired from a nonce chain.

In an embodiment, the nonce may use the whole or a portion of a value acquired by hashing the hash value of the block generated by the first master node and the private key of a corresponding node or a value acquired from the nonce chain of the corresponding node.

In an embodiment, selecting the second candidate nodes may include comparing a coupon, which is at least a portion of the head hash value, with a threshold value.

In an embodiment, selecting the second candidate nodes may further include calculating a distance corresponding to the result of comparison of the coupon with the threshold value.

In an embodiment, each of the second candidate nodes may record the distance corresponding thereto and a digital signature for checking whether the distance is legitimately issued in a candidate block and transmit the candidate block to another node, or each of the second candidate nodes may perform a checking process through a nonce chain in order to check the distance corresponding to the node and whether the distance is legitimately issued.

In an embodiment, the method may further include announcing, by each of the second candidate nodes, the coupon and the calculated distance to the node pool or the first candidate nodes.

In an embodiment, each of the first candidate nodes may sort the second candidate nodes based on the result of sorting the calculated distances.

In an embodiment, each of the first candidate nodes may transmit the collected distances of the second candidate nodes to the first master node.

In an embodiment, the number of second candidate nodes may be used as a population parameter of the vote taken by the first candidate nodes.

In an embodiment, the distance values of the second candidate nodes may be used in the vote taken by the first candidate nodes.

In an embodiment, in order to use the consensus node selection scheme as a private consensus mechanism, a node that is selected as a node to generate a candidate block may be shared through the node pool, and predetermined nodes may be registered in the node pool.

In an embodiment, in order to use the consensus node selection scheme as a public consensus mechanism, all of participation nodes are allowed to participate in the node pool.

A method for selecting a consensus node that is used to generate a blockchain according to an embodiment of the present invention may include performing a hash operation by taking the hash value of a previous block and a digital signature signed with the private key of a participation node or a value acquired from a nonce chain as input; comparing a coupon, which is configured with at least a portion of the result of the hash operation, with a threshold value; and selecting the participation node as a candidate node for generating a block based on the result of comparison.

In an embodiment, a node pool may be predetermined or may include all nodes.

In an embodiment, a node pool may be classified into two or more groups based on the result of comparison.

In an embodiment, the two or more groups may include a pass group and a fail group, and the pass group and the fail group may have a binomial distribution characteristic.

In an embodiment, the mean and the variance of nodes to be selected may be calculated according to a specific probability distribution.

An apparatus for generating a blockchain according to an embodiment of the present invention may include at least one processor; and memory configured to store at least one instruction executed by the at least one processor, wherein the at least one instruction may be executed by the at least one processor such that the hash value of a block generated by a first master node is calculated, such that second candidate nodes are selected using the result of hashing a value acquired by digitally signing the calculated hash value or a result of hashing the hash value of the block generated by the first master node and a value acquired from a nonce chain, such that the selected candidate nodes take a vote in order to lock a second master block, among second candidate blocks, and such that the first master node locks the second master block.

In an embodiment, based on the result of the vote by the nodes that generated the second candidate blocks, the first master node may lock a second candidate block that presents a minimum or maximum distance approved by more than a certain percentage of the nodes.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
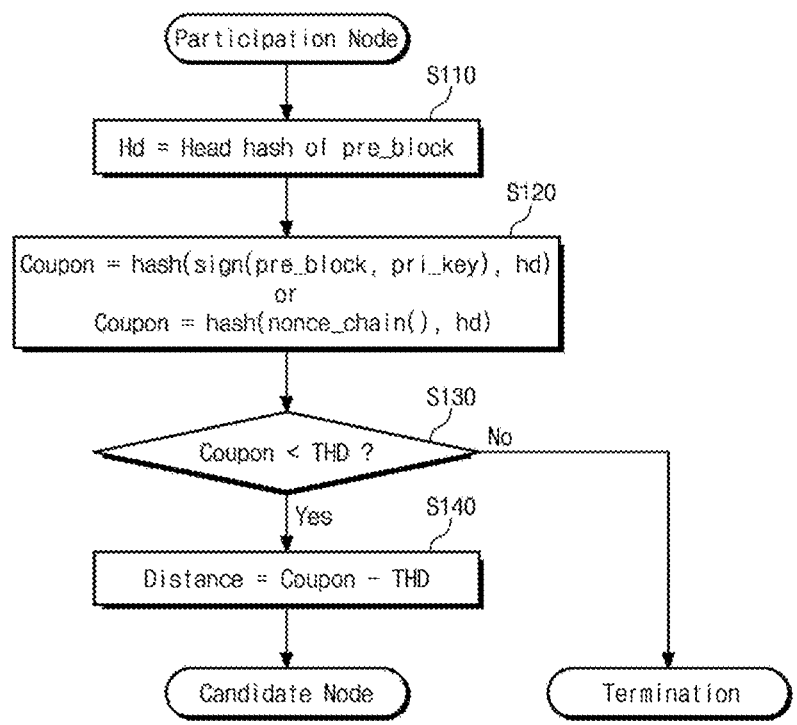
FIG. 1 is a flowchart that shows a method for selecting consensus nodes according to an embodiment of the present invention.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that those embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms.

These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, terms used herein are merely used to describe specific embodiments, and are not intended to limit the present invention. A singular expression includes a plural expression unless a description to the contrary is specifically pointed out in context.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Generally, as distributed consensus algorithms, there are Proof-of-Work (PoW), Proof-of-Stake (PoS), and the like. PoW is a consensus algorithm employed by bitcoin, which is the first blockchain application. PoS is a consensus algorithm that is adopted by more and more public blockchains these days.

First, the concept and characteristics of Proof-of-Work (PoW) will be described below. For the convenience of description, a description will be made only with respect to bitcoin. PoW is a method in which a node proves itself by showing that the node invests its resources (e.g., computing power) in "work", thereby preventing illegality. In order to participate in consensus based on PoW, participation nodes are required to invest their resources. Even in the case of network spam, a Denial-of-Service (DoS) attack, or the like, it is required to invest more than 51% of total resources in order for the attack to succeed. In order to generate a block, a unique hash value is required. Here, the unique hash value can be found only by randomly inputting a nonce value. However, because verification of such a hash value is costless, all of the participation nodes may easily verify the hash value.

Among the participation nodes, only the first node that found the hash value of the next block becomes eligible to generate (or mine) a block. If the cost required for generating a block is close to '0', all of the nodes may easily generate a block and add the same to a blockchain.

When nodes simultaneously generate blocks, the blockchain may fork, whereby multiple chains may be generated. Among the multiple chains, the longest chain may be selected. In this case, if malicious nodes continue to generate fraudulent blocks, bitcoins may be destroyed. In order to prevent bitcoins from being destroyed, PoW forces the cost for generating the next block to be invested in finding a random hash value. Because this work is very costly, it may require running the computers of all of the nodes for about ten minutes in order to succeed. Even if malicious nodes attempt to destroy a bitcoin network, their attacks may not succeed unless more than a certain number of resources, that is, more than 51% of all resources, are invested.

In order to generate a block, PoW requires a unique hash value that can be found only by randomly inputting a nonce value. Here, in order to find such a hash value, it is necessary to invest an excessive amount of resources, such as computing power. Such excessive power consumption causes an environmental problem and an economic problem; that is, electricity rates may be higher than the reward for mining (the reward for mining<electricity rates). This is referred to as 'meaningless energy consumption'. Also, PoW requires a specific computational capability. Special chips into which computational capabilities are integrated have emerged, and the problem of the gap between those who can afford such special chips and those who cannot may be caused in terms of monetary economy. When computational capabilities are united by a minority, a centralization problem may occur. This is monopolization by a minority. Also, in the case of bitcoin, the number of blocks is limited to twenty one million, which causes an inflation problem. Also, bitcoin may be provided as a source of illegal money or crime money and a means of tax evasion.

The concept and characteristics of Proof-of-Stake (PoS) will be described below. PoS adopts a method in which a node proves itself by showing an ownership stake. PoS is configured such that the probability that each node generates a block is proportional to the stake of tokens owned by the node. When a stake of tokens is assumed to be resources to be invested, PoS may be regarded as a kind of PoW. The algorithm of PoS may be represented as 'PoW using a digest'. When it is compared with PoW, PoS consumes little energy and prevents integration of resources.

In the case of PoS, a node having a larger stake of tokens is more advantageous in generating a block. Accordingly, with regard to block generation, a centralization problem may be caused. Also, respective nodes show a tendency to merely collect tokens without consuming tokens. As an alternative thereto, "Proof of Stake Velocity", which decreases the valuation of old unused tokens, is proposed. Also, in the case of PoS, a 'Nothing at Stake' problem may be caused because the required resource costs are very cheap. This problem is caused when a fork takes place. When a chain forks, the size of the stake owned by each node is the same for both chains. In this case, because nodes are able to build blocks on both chains thanks to the inexpensive resource costs, the nodes do not try to resolve the fork. Conversely, a node may deliberately attempt a fork because the node may bet on both chains.

For example, when a genesis block, which is the first block of a blockchain, is generated, the person who initiates the system has a 100% stake therein at that time, and he or she may generate all of the blocks over and over again. Also, as long as each node has a stake, the node may generate blocks again from the block generated by itself. Accordingly, it is impossible to prevent forgery and falsification using only PoS. Also, due to the low cost of generating a block, it is possible to trace even old blocks and forge the entire chain.

In summary, a blockchain is configured in order to verify the validity of blocks in the process of chaining the blocks in the order in which the blocks are generated, thereby preventing forgery and falsification of information. However, PoW and PoS, which are representative distributed algorithms, have limitations due to the above-described problems. Furthermore, hash power controlled by a small number of miners or those who have a large stake of tokens may cause a centralization problem. In the case of PoW, a node having high computational capability takes the initiative in distributed consensus. In the case of PoS, those who have a large stake of tokens have an advantage. Accordingly, a new distributed consensus algorithm for transparently granting permission to generate a block and guaranteeing the legitimacy of all transactions is required.

A method for selecting consensus nodes and a method and apparatus for generating a blockchain using the same according to an embodiment of the present invention applies a distributed consensus algorithm based on unpredictable selection of subjects of distributed consensus, whereby the limitations as to scalability and security of the existing PoW and PoS algorithms of a blockchain may be overcome.

The distributed consensus algorithm according to an embodiment of the present invention may be implemented such that resource consumption is minimized by making only some nodes participate in generating blocks, such that the nodes to obtain permissions to generate a block are selected in an unpredictable manner and the selected nodes probabilistically represent all of the nodes, such that more than a certain number of nodes are stably secured through selection, and such that a fork is prevented from being formed in a blockchain. Also, the distributed consensus algorithm according to an embodiment of the present invention is applicable to public and private blockchains and prevents a ledger from being arbitrarily falsified after a block is locked.

The distributed consensus algorithm according to an embodiment of the present invention may be implement to realize Proof-of-Nonce (PoN) in order to provide a lightweight distributed consensus mechanism, scalability, and security.

FIG. 1 is a flowchart that shows a method for selecting candidate nodes to generate a block in a distributed consensus algorithm according to an embodiment of the present invention. Referring to FIG. 1, PoN may select candidate nodes to generate a block using the following method.

Each participation node may digitally sign the hash value of the previous block with the private key thereof. Here, the hash value (hd) of the previous block may be the head hash value of the previous block (SI 10).

Pre_blk_sign=sign(Key_private)(pre_hash)

Because the hash value of the previous block (pre_hash) is digitally signed (Pre_blk_sign) with the private key (Key_private) of the participation node, other nodes are not able to predict whether the participation node will gain permission to generate a block. Because none of the nodes know the private keys (Key_private) of other nodes, it is impossible to predict the result of the digital signature. In an embodiment, the node that gains permission to generate a candidate block presents the digital signature thereof along with the fact that the node has gained permission, whereby other nodes may verify the fact that the node has gained the permission.

In an embodiment, in order for nodes to become candidates for generating a block, the nodes are required to register themselves in a node pool. When nodes register themselves in the pool, as long as the condition for registration is strongly controlled, the blockchain may be used as a private blockchain. Meanwhile, when all of the nodes participating in the blockchain are allowed to register themselves in the pool, the pool may be used for a public blockchain.

The result of the digital signature (Pre_blk_sign) of each participation node may be processed so as to have a uniform distribution characteristic. For example, the digital signature (Pre_blk_sign) is hashed as shown below, whereby a nonce (key) may be generated.

key=hash(Pre_blk_sign)

Here, the value of the key has a uniform distribution characteristic due to the characteristic of a hash. Also, in order for the key to have such a characteristic, the key may be implemented using the hash value of the previous block and the hash value of a value acquired from a nonce chain.

In an embodiment, a portion of the generated key (e.g. 32 bits of the key data) may be used as a coupon. In an embodiment, the coupon, which is acquired by selecting a portion of the key value, also has a uniform distribution characteristic. In an embodiment, the coupon may be the value acquired by hashing the digital signature value (sign (pre_block, pri_key)) and the hash value (hd) of the previous block. In another embodiment, the coupon may be the value acquired by hashing the nonce chain value (nonce_chain( )) and the hash value (hd) of the previous block (S120).

When a specific condition is satisfied as the result of comparison of the coupon of a node with an arbitrary threshold value (THD), the node is eligible to serve as a candidate for generating a block at step S130. When the specific condition is satisfied, it may be represented as 'pass'. Here, the probability p that the node is selected as the candidate may be determined by comparing the coupon with the threshold value. Conversely, when the specific condition is not satisfied, it may be represented as 'fail'. Here, the probability of 'fail' becomes (1-p). Based on the two comparison results, the distribution of the probability that K nodes are selected from a total of N nodes will follow a binomial distribution, of which the mean and the variance are Np and Np(1-p), respectively. When N is sufficiently large in a binomial distribution, the distribution of the probability that K nodes are selected from a total of N nodes will converge to a normal distribution, of which the mean and the variance are the mean and variance of the binomial distribution, based on a central limit theorem. Accordingly, some nodes that probabilistically represent all of the nodes may be selected. When the mean of the nodes that are eligible to serve as candidates is controlled, stable nodes may be continuously selected using the cumulative distribution function of a normal distribution.

The node that gains permission to generate a candidate block may record a distance, which is a coupon value or the result of an operation performed on the coupon value and the threshold value (e.g., a distance therebetween), a digital signature for checking whether the distance is legitimately issued, and the like in a candidate block and transmit the candidate block to other nodes at step S140.

According to the above-described method for selecting candidate nodes, resource consumption may be minimized because only some nodes participate in generating a block, the nodes to gain permission to generate a block may be selected in an unpredictable manner, the selected nodes may probabilistically represent all of the nodes, and more than a certain number of nodes may be stably secured through selection.

Meanwhile, a new distributed consensus algorithm (PoN) according to an embodiment of the present invention may prevent a fork from occurring in a blockchain and prevent a ledger from being arbitrarily falsified after a block is locked. Also, the new distributed consensus algorithm may be applied to both public and private blockchains.

Figure 2:
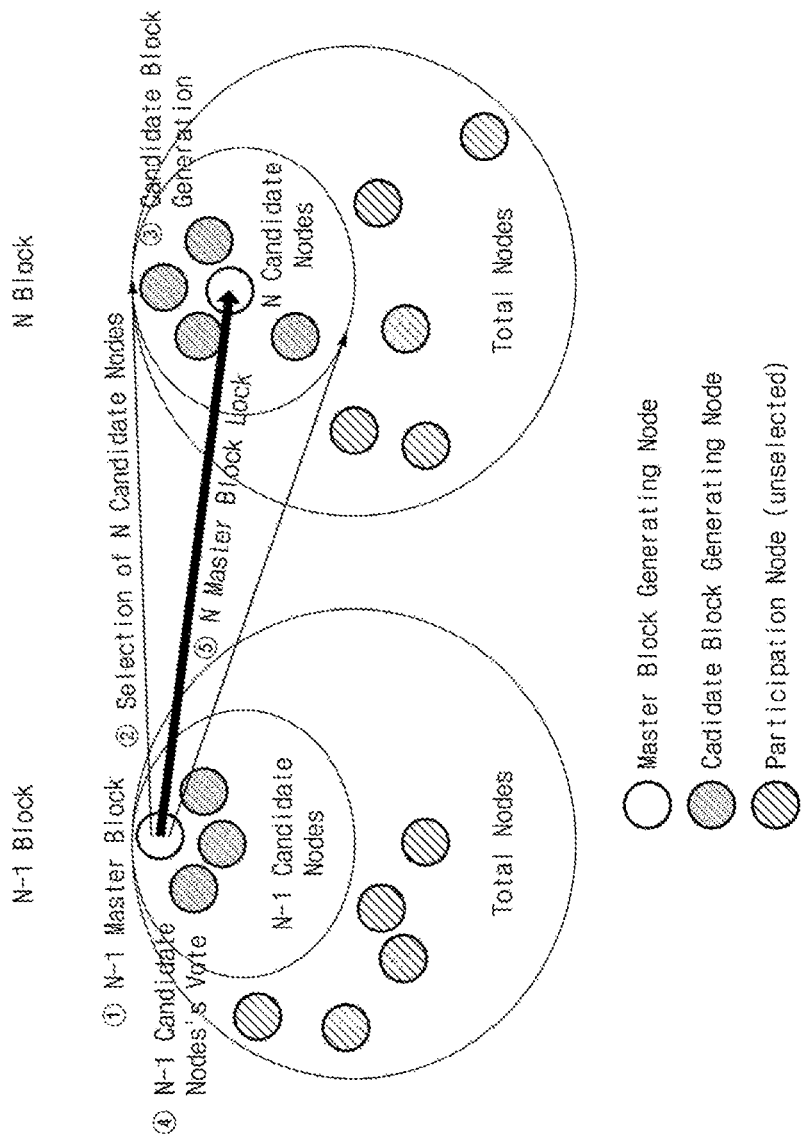
FIG. 2 is a view that conceptually shows the operation of a distributed consensus algorithm according to an embodiment of the present invention.

FIG. 2 is a view that conceptually shows the operation of a distributed consensus algorithm according to an embodiment of the present invention. Referring to FIG. 2, the operation of the distributed consensus algorithm may proceed as follows.

As described above, based on the participation nodenode selection scheme, first candidate blocks may be generated. When one of the generated first candidate blocks is locked, a node corresponding thereto may operate as the master node of the first block (①). In an embodiment, when the first master node is selected, the master node of the first block (N−1 Block) announces the number of nodes that generated the first candidate blocks and the distances presented by the respective nodes, whereby the number of nodes may be used as a parameter of a vote for a second block.

In an embodiment, the hash value of the block generated by the master node of the first block may be used as a previous-block hash value for generating second candidate blocks. Here, through the operation described in the method for selecting candidate nodes for generating a block, each node may calculate whether the node is able to gain permission to generate a second candidate block by comparing the coupon thereof with a threshold value (②).

The node that gains permission to generate a second candidate block may generate a candidate block and distribute the same to all of the nodes (③).

Each of the nodes that generated the first candidate blocks transmits one or more distances, included in the blocks received from the second candidate nodes, to the first master node, thereby participating in the vote (④).

In the result of the vote taken by the nodes that generated the first candidate blocks, when it is determined that more than a certain percentage of the nodes (e.g., a majority or ⅔ of the nodes) approve the minimum (or maximum) distance, which is extracted by sorting the distances, the first master node may transmit the second candidate block that presents the corresponding distance to all of the nodes in order to lock the second candidate block as a second block (that is, to finally generate the second block) (⑤).

Here, when the second block (N block) is locked, the above-described processes are repeated for a third block, whereby a blockchain may be completed.

The distributed consensus algorithm (PoN) according to an embodiment of the present invention is configured such that the first master node selects the second master node based on the result of a vote taken by the nodes generating the first candidate blocks, whereby a consensus mechanism in which a fork does not occur may be provided.

Also, in the distributed consensus algorithm (PoN) according to an embodiment of the present invention, after a master node is selected, a block is locked in order to prevent a vote for changing the master node, whereby it is impossible to tamper with a ledger.

Also, the distributed consensus algorithm (PoN) according to an embodiment of the present invention may be applied to a private blockchain when the nodes allowed to participate in generating candidate blocks are selected in advance, and may be applied to a public blockchain when any node can participate in generating candidate blocks.

Also, in the distributed consensus algorithm (PoN) according to an embodiment of the present invention, excessive resource consumption, as in PoW, is not caused.

Also, in the distributed consensus algorithm (PoN) according to an embodiment of the present invention, because the nodes to participate in block update are determined whenever a block is generated, it is impossible to predict the nodes and attack the same.

Also, the distributed consensus algorithm (PoN) according to an embodiment of the present invention selects the majority opinion of the nodes that generated a previous block through a vote, thereby overcoming the disadvantage of PoS, in which a node having more resources has exclusive permission for block update.

Also, in the distributed consensus algorithm (PoN) according to an embodiment of the present invention, because the process of locking a second block is determined by the first candidate nodes, illegal transactions, such as double spending and the like, may be prevented.

Also, the distributed consensus algorithm (PoN) according to an embodiment of the present invention may be applied in common to a private blockchain and a public blockchain by managing the nodes participating in generating candidate blocks.

Figure 3:
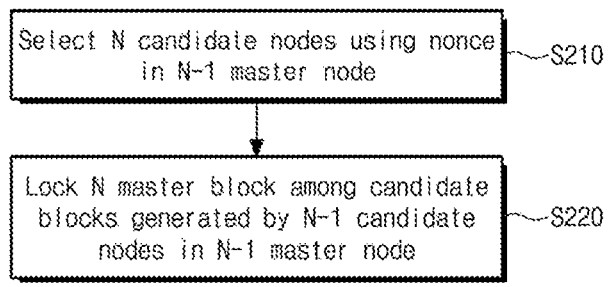
FIG. 3 is a flowchart that shows a method for generating a blockchain according to an embodiment of the present invention.

FIG. 3 is a flowchart that shows a method for generating a blockchain according to an embodiment of the present invention. Referring to FIGS. 1 to 3, the method for generating a blockchain may proceed as follows.

Using the block generated by a first master node and the digital signatures of the nodes registered in a pool or a nonce calculated using a value acquired from a nonce chain, second candidate nodes for generating a second block may be selected at step S210. For example, based on the candidate node selection scheme described with reference to FIG. 1, the second candidate nodes may be selected from among all of the nodes.

Then, the first master node may lock a second master block, among candidate blocks that are generated in the second candidate nodes, as the result of a vote taken by the first candidate nodes at step S220.

In an embodiment, based on the result of the vote taken by the nodes that generated the first candidate blocks, the first master node may lock the second candidate block that presents the minimum (or maximum) distance, approved by more than a certain percentage of the nodes (e.g., a majority or ⅔ of the nodes), as the second master block.

In an embodiment, the first master node may lock the second master block.

In an embodiment, the nodes generating the first candidate blocks, rather than all of the nodes, may participate in the vote only for the second candidate block.

In an embodiment, when the nodes selected as the nodes to generate candidate blocks are shared using a pool, if only predetermined nodes are registered in the pool, the consensus node selection scheme may be used as a private consensus mechanism. In another embodiment, if all of the participation nodes can be registered in the pool, the consensus node selection scheme may be used as a public consensus mechanism. That is, the consensus node selection scheme according to the present invention may be used in common for private and public consensus mechanisms.

In an embodiment, the node generating the first master block may trigger an event for locking a second master block.

In an embodiment, when whether a node is eligible to serve as a candidate for generating a second block is determined, the asymmetric private key of the node or a value acquired from a nonce chain is used, whereby each node may not predict whether another node will gain permission to become a candidate.

In an embodiment, in order to determine whether each node is eligible to serve as a candidate for generating a second block, the coupon of the node is compared with a threshold value. Based on the comparison result, the respective nodes may be classified into two or more groups. In an embodiment, the two or more groups may be divided into a 'pass' group and a 'fail' group. The two groups may have a binomial distribution characteristic. In an embodiment, the mean and variance of the nodes to be selected may be calculated based on a specific probability distribution.

In an embodiment, when it generates a candidate block, each of the nodes that gain permission to generate a second candidate block announces a distance, which is calculated using the acquired coupon and the threshold, whereby the nodes that generated the first candidate blocks may sort the distances according to the values thereof.

In an embodiment, the nodes that generated the first candidate blocks may transmit one or more distances of the second candidate blocks, collected by themselves, to the first master node.

In an embodiment, when the first master node selects the second master node based on the result of a vote taken by the nodes that generated the first candidate blocks, the first master node may announce the number of nodes generating second candidate blocks and the distance values to all of the nodes. In an embodiment, the number of nodes that generate the second candidate blocks, announced by the first master node, may be used as a population parameter of the vote for the second block. In an embodiment, the sorted distance values of the second candidate blocks, announced by the first master node, may be used for the vote.

Based on an embodiment, some or all of the steps and/or operations may be implemented or performed using one or more processors executing instructions, programs, interactive data structures, and client and/or server components stored in one or more nonvolatile computer-readable storage media.

Figure 4:
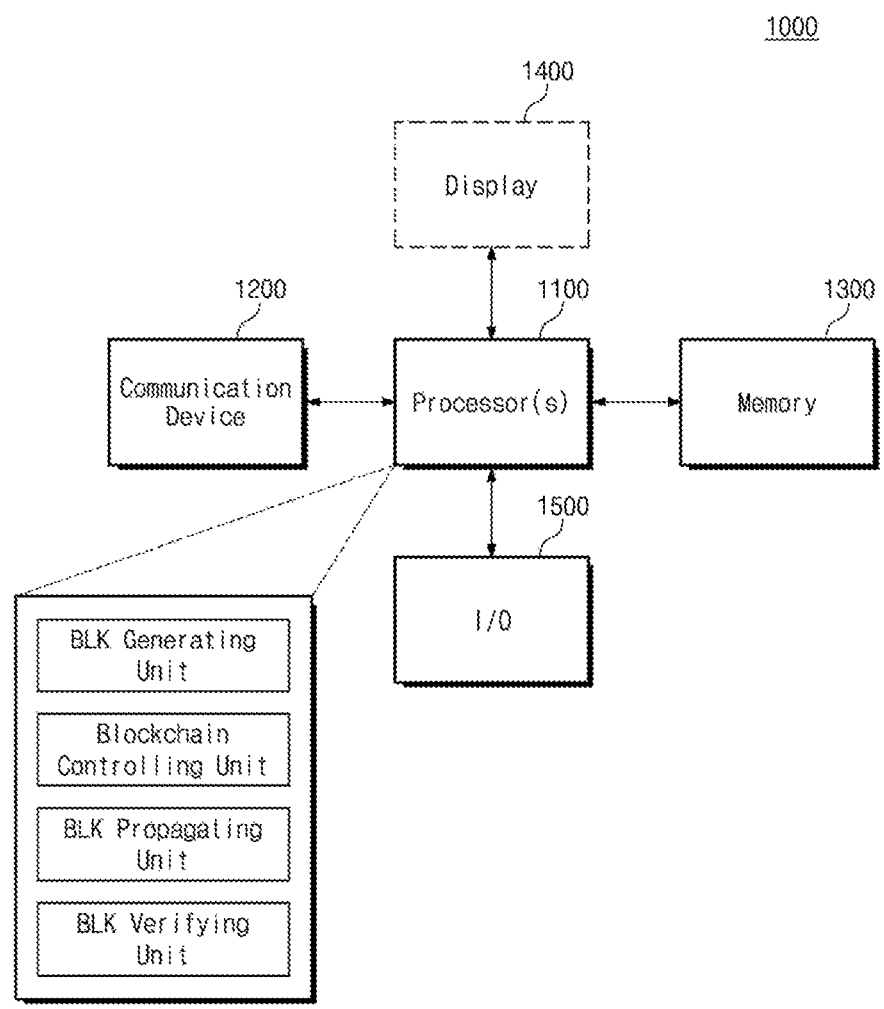
FIG. 4 is a view that shows an apparatus for generating a blockchain according to an embodiment of the present invention.

FIG. 4 is an exemplary view that shows an apparatus 1000 for generating a blockchain according to an embodiment of the present invention. Referring to FIG. 4, the apparatus 1000 for generating a blockchain may include at least one processor 1100, a network interface 1200, memory 1300, a display 1400, and input/output devices 1500.

The processor 1100 may include at least one of the devices described with reference to FIGS. 1 to 3, or may be implemented using at least one of the methods described with reference to FIGS. 1 to 3. The processor 1100 may execute instructions in order to unpredictably select the node to participate in the generation and update of a block through a digital signature created using the previous block and the private key of the node, to prevent a certain node from having exclusive permissions by locking a second block based on the result of a vote taken by the nodes that generated the first candidate blocks, and to prevent illegal transactions, such as double spending and the like, in such a way that the master node of the first block selects the master node of a second block after checking the content digitally signed with the private keys of the nodes.

The processor 1100 may run programs and control the apparatus 1000 for generating a blockchain. The apparatus 1000 for generating a blockchain may be connected with an external device (e.g., a personal computer or a network) and exchange data therewith via the I/O devices 1500. The apparatus 1000 for generating a blockchain may be any of various types of electronic systems, including mobile devices such as a mobile phone, a smartphone, a PDA, a tablet PC, a laptop, and the like, computing devices such as a PC, a tablet PC, a netbook, and the like, and electronic devices such as a TV, a smart TV, a security device for gate control, and the like.

As described in FIG. 4, the processor 1100 may be implemented to run a block-generating unit, a blockchain-controlling unit, a block-propagating unit, and a block-verifying unit using program code. The block-generating unit may generate a new block that is necessary for transaction records. The blockchain-controlling unit may control the new block so as to be added to the blockchain thereof using the above-described method for generating a blockchain, specifically using the distributed consensus node selection scheme. The block-propagating unit may propagate the new block over the network in order to verify the validity of the new block to be added to the blockchain. The block-verifying unit may receive a block generated in another node in the network and verify the validity of the received block.

The network interface 1200 may be implemented so as to communicate with an external network using any of various wired/wireless methods.

The memory 1300 may store computer-readable instructions. The processor 1100 may perform the above-described operations by executing the instructions stored in the memory 1300. The memory 1300 may be volatile or nonvolatile memory.

The memory 1300 may include a storage device in order to store user's data. The storage device may be an embedded multimedia card (eMMC), a solid-state drive (SSD), universal flash storage (UFS), or the like. The storage device may include at least one nonvolatile memory device. The nonvolatile memory device may be any one of NAND flash memory, Vertical NAND (VNAND), NOR flash memory, Resistive Random-Access Memory (RRAM), Phase-Change Memory (PRAM), Magnetoresistive Random-Access Memory (MRAM), Ferroelectric Random-Access Memory (FRAM), Spin-Transfer-Torque Random-Access Memory (STT-RAM), and the like.

The embodiments described above may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, and any other device capable of executing instructions and responding thereto. The processing device may run an operating system (OS) and one or more software applications executed on the OS.

Also, the processing device may access, store, manipulate, process, and create data in response to the execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The apparatus 1000 for generating a blockchain according to an embodiment of the present invention includes at least one processor 1100 and memory 1300 for storing at least one instruction executed by the at least one processor 1100. The at least one instruction may be executed by the at least one processor 1100 such that participation nodes related to the generation of a first block are selected using digital signatures, such that the selected participation nodes participate in a vote in order to lock a second master block, and such that a master node, corresponding to the generation of the first block, locks a master block corresponding to the generation of the second block.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts.

Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured such that it operates as one or more software modules in order to perform the operations of the embodiment, and vice-versa.

Through the method and apparatus for generating a blockchain according to an embodiment of the present invention, the node to participate in the generation and update of a block may be selected in an unpredictable manner through a digital signature created using a previous block and the private key of the node, and a second block may be locked based on the result of a vote taken by the nodes that generated first candidate blocks, whereby a disadvantage in which a certain node has exclusive permission may be overcome and verification time may be significantly reduced.

Through the method and apparatus for generating a blockchain according to an embodiment of the present invention, the master node of a first block selects the master node of a second block after checking content that is digitally signed with the private keys of nodes in order to guarantee the integrity of distributed ledgers, whereby illegal transactions, such as double spending or the like, may be prevented.

According to the method and apparatus for generating a blockchain according to an embodiment of the present invention, excessive resource consumption, as in PoW, is not caused in PoN, and the disadvantage of PoS, in which a node having more resources has exclusive permission to perform update, may be overcome.

Through the method and apparatus for generating a blockchain according to an embodiment of the present invention, the master node that registers a first block selects a second block based on the result of a vote, whereby excessive resource consumption may be prevented. Also, because the master node selects the next master node, illegal transactions, such as double spending or the like, may be prevented.

Through the method for selecting consensus nodes and the apparatus and method for generating a blockchain using the same according to an embodiment of the present invention, excessive use of resources, as in Proof-of-Work (PoW), may be prevented.

The method for selecting consensus nodes and the apparatus and method for generating a blockchain using the same according to an embodiment of the present invention determine the nodes to participate in block update whenever a block is generated, whereby the nodes may be prevented from being predicted and attacked.

The method for selecting consensus nodes and the apparatus and method for generating a blockchain using the same according to an embodiment of the present invention select the majority opinion of the nodes that generated the previous block through a vote, whereby a disadvantage in which a node having more resources gains exclusive permission for block update, as in Proof-of-Stake (PoS), may be overcome.

The method for selecting consensus nodes and the apparatus and method for generating a blockchain using the same according to an embodiment of the present invention may prevent illegal transactions, such as double spending and the like, because the process of locking a second block is determined by the nodes that approved a first block.

The method for selecting consensus nodes and an apparatus and method for generating a blockchain using the same according to an embodiment of the present invention may be applied in common to a private blockchain and a public blockchain by managing the nodes that participate in generating candidate blocks.

Meanwhile, the above description is merely specific embodiments for practicing the present invention. The present invention encompasses not only concrete and available means but also the technical spirit corresponding to abstract and conceptual ideas that may be used as future technology.

What is claimed is:

1. A method for generating a blockchain, comprising:
    performing a hash operation by using a previous block value related to a previous block of the blockchain and a nonce corresponding to a participation node to generate a comparison value;
    comparing the comparison value with a threshold value once for the participation node and a new block;
    selecting the participation node as a member of consensus nodes based on the result of the comparison; and
    generating the new block of the blockchain based on a consensus among at least one of the consensus nodes,
    wherein the nonce is generated based on a nonce chain of the participation node, and
    wherein the threshold value determines a probability that the participation node is selected as the member of the consensus nodes.

2. The method of claim 1, wherein the previous block value related to the previous block corresponds to a head hash value of the previous block.

3. The method of claim 1, wherein the nonce chain is used for verifying at least one of the consensus nodes.

4. An apparatus for generating a blockchain, comprising:
    at least one processor; and
    memory configured to store at least one instruction executed by the at least one processor,
    wherein the at least one instruction is executed by the at least one processor
        such that a hash operation is performed by using a previous block value related to a previous block of the blockchain and a nonce corresponding to a participation node to generate a comparison value,
        such that the comparison value is compared with a threshold value once for the participation node and a new block, such that the participation node is selected as a member of consensus nodes based on the result of the comparison, and
        such that the new block of the blockchain is generated based on a consensus among at least one of the consensus nodes, and
    wherein the nonce is generated based on a nonce chain of the participation node, and
    wherein the threshold value determines a probability that the participation node is selected as the member of the consensus nodes.

5. The apparatus of claim 4, wherein the nonce chain is used for verifying at least one of the consensus nodes.

* * * * *